United States Patent

[11] 3,612,200

| [72] | Inventor | Rene E. Cailyer<br>3032 Laurier Ave. East, Montreal 405, Quebec, Canada |
|---|---|---|
| [21] | Appl. No. | 867,151 |
| [22] | Filed | Oct. 17, 1969 |
| [45] | Patented | Oct. 12, 1971 |

[54] TRACTION DEVICE FOR A SPINNING TRACTION WHEEL
4 Claims, 7 Drawing Figs.

[52] U.S. Cl. .................................................. 180/7, 188/4 R
[51] Int. Cl. ..................................................... B62d 57/00
[50] Field of Search ........................................ 180/7, 15; 188/4, 4 R, 4 B; 152/209 R; 301/37

[56] References Cited
UNITED STATES PATENTS

| 2,271,337 | 1/1942 | Hale | 152/209 R |
| 2,437,031 | 3/1948 | Jasmer | 152/228 |
| 2,513,691 | 7/1950 | Tower | 188/4 R |
| 2,806,556 | 9/1957 | Norris | 188/4 R |
| 2,809,704 | 10/1957 | Greely | 180/7 X |

FOREIGN PATENTS

| 914,465 | 7/1954 | Germany | 188/4 |

*Primary Examiner*—Leo Friaglia
*Attorney*—Raymond A. Robic

ABSTRACT: A mat extending over a segment of a traction wheel of a vehicle and spaced therefrom in its upper position is mounted on the casing of the axle of the wheel so as to eccentrically rotate thereabout to touch the tire in its lower position. A device locks the mat in its upper inoperative position and unlocks it to let it fall towards its lower position when additional traction is needed. The device locks back the mat in its upper position to which it returns by the spinning of the wheel.

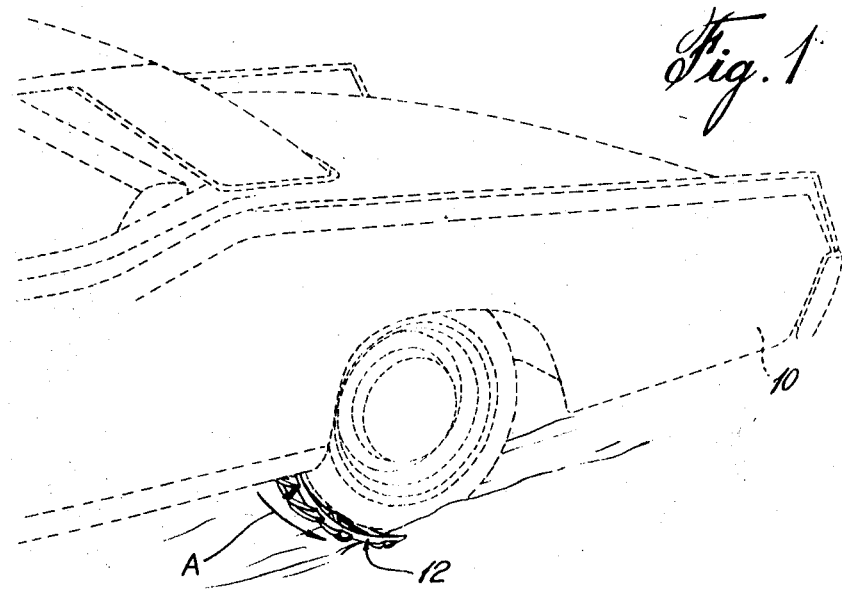
Fig. 1
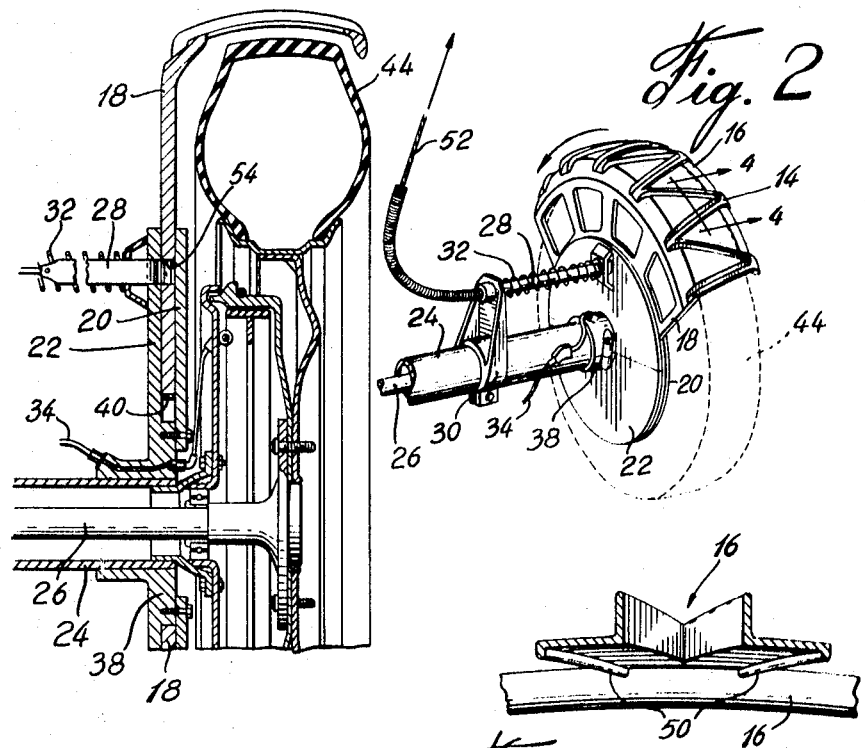
Fig. 2
Fig. 3
Fig. 4
INVENTOR
René E. CAILYER
BY
ATTORNEY

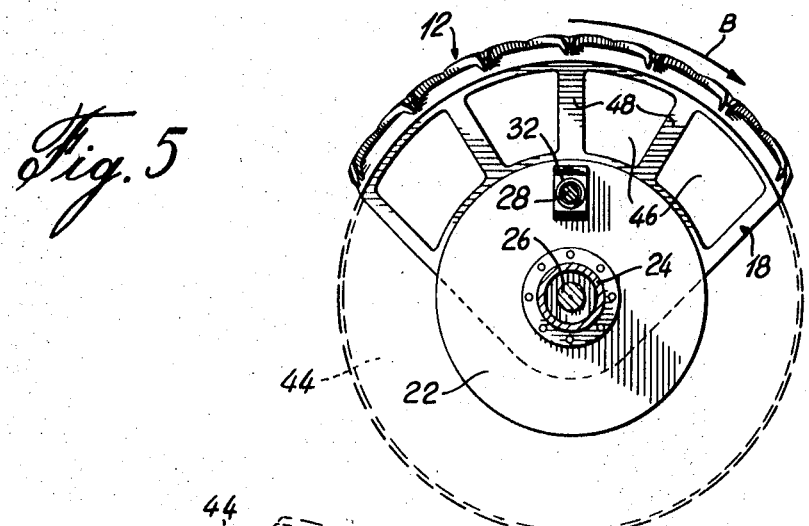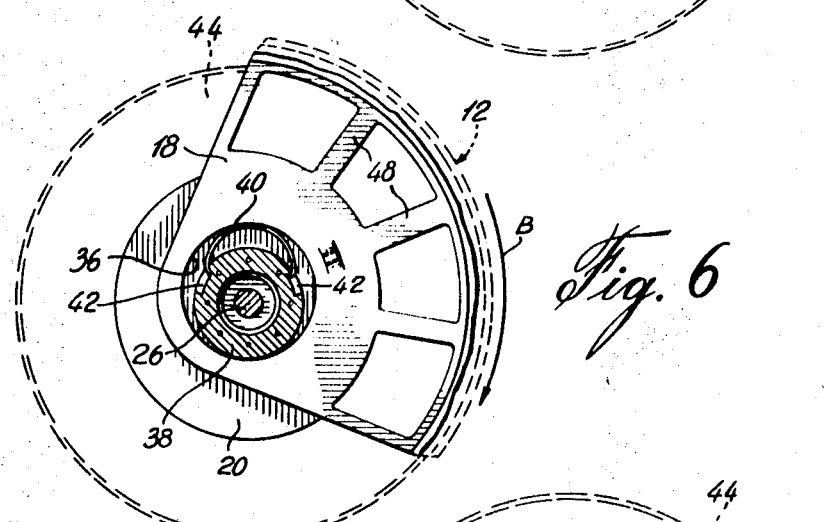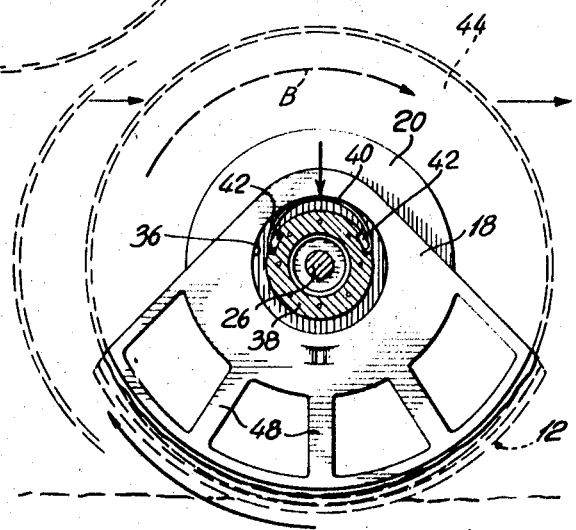

TRACTION DEVICE FOR A SPINNING TRACTION WHEEL

This invention relates to a retractable device for freeing a wheeled vehicle which is stuck in mud, snow, ice or the like due to slipping of the traction wheels thereof on a slippery surface, i.e. lack of sufficient friction between the wheel and the ground-rolling surface.

The purpose of the invention is to momentarily insert between and in contact with the slippery ground surface and the tire surface a member that has a rough or corrugated surface so that the tire will not slide on the slippery surface. The member may have a rough surface on both sides so that the wheel itself will not slide thereon, i.e. surfaces that have good frictional grip on both the tire surface and on the ground surface.

It is a further object of the invention that the device remains in operational position for not more than the time needed to free the stranded vehicle. The device is retractable, and does not require that it be installed or positioned by hand. It is preferably controlled from inside the vehicle.

The invention comprises a tractional mat fixed on a radial web or sector plate rotatable about an axis parallel to just above the axis of the vehicle wheel, so that in retracted position the mat will be located a short distance vertically above the tire surface and releasably locked in that position. When the sector plate is released, the mat freely rotates downwardly until it is gripped by the tread surface of the tire, as the eccentric path thereof intersects the circular path of the said tread surface. The mat then follows the rotation of the wheel and engages the slippery surface in a nonslip fashion to restore traction just long enough to allow the vehicle to move away from its stranded position.

The mat is liberated after passing under the wheel as it reaches a position opposite that at which it was first engaged by the tire tread. Upon being liberated, it continues its rotation upwardly and is automatically locked in position as it passes its starting point.

The rotation of the mat may be assured by means of an eccentric bearing member secured on the wheel shaft casing and an appropriate spring mounted between the fixed casing and the moving parts holding the mat. The eccentric bearing ring may present necessary holes therethrough for passage of wheel brake lines. The mat is preferably supported by a sector plate pivotally mounted about the casing of the axle of the wheel and eccentrically rotating thereabout so that the mat is spaced from the wheel at the top and in contact therewith at the bottom.

The locking mechanism which is used to hold the device in retracted position can advantageously be operated from inside the vehicle by means of appropriate control cables or the like. The radial web or the sector plate rotates parallel to a holding plate solidly fixed to the casing and a rod is slidingly engaged through said holding plate and biased toward the sector plate or radial web through a hole provided therein for releasing fixing said mat in its upper position.

In the drawings which illustrate the embodiments of the invention,

FIG. 1 is a perspective view of the traction mat in operation on a car;

FIG. 2 is a perspective view of the traction mat mounted on a wheel;

FIG. 3 is a vertical sectional view taken through the traction mat and the wheel, as shown in FIG. 2;

FIG. 4 is a sectional view of an L-shaped rib taken through line 4—4 of FIG. 2;

FIGS. 5, 6 and 7 are plan views of the mat and the sector plate taken respectively in the upper, intermediate and lower positions.

FIG. 1 illustrates a car which is stuck in a slippery substance while the mat 12 is released into operation in the direction of the arrow A.

FIG. 2 illustrates a perspective view of a zigzag mat 14 mounted between a portion of a ring 16 and a sector plate 18. The sector plate 18 is sandwiched between a wheelplate 20 and a holding plate 22 and pivots about the hub of holding plate 22. A rod 28 is slidingly mounted between a bracket 30 fixed on the casing 24 and the holding plate 22 and is biased by the spring 32 in a direction of the sector plate 18 so as to lock the said sector plate in its upper position.

In FIG. 3, the sector plate 18 is clearly illustrated in cross section between the holding plate 22 and the wheelplate 20. The rod 28 is biased towards the right-hand direction by the coil spring 32 pushing against the ring 23 fixed to the rod 28. The holding plate 22 is solidly fixed on the casing 24 of the axle 26 by a hub 38 so as to prevent any rotation of the holding plate 22. The wheelplate 20 is solidly fixed to the holding plate so as to prevent any relative rotation therebetween.

The axial part or hub 38 of the holding plate 22 is perforated so as to enable a brake fluid line 34 to reach the brakedrums or discs.

FIG. 5 is a view taken from the left-hand side of FIG. 3 through the casing 24 adjacent the holding plate 22. The mat 12 is in its upper position locked by the rod 28.

FIGS. 6 and 7 illustrate a view taken from the left-hand side of FIG. 3 and cutting across the plane between the holding plate 22 and the sector plate 18. The sector plate 18 is provided with an aperture 36 surrounding the hub part 38 of the holding plate 22. An arched leaf spring 40 is slidingly mounted at both ends into peripheral recesses 42 in the hub 38. The sector plate 18 is biased in the upper direction by the leaf spring 40 which is strong enough to maintain the sector plate upwardly when only the weight of the sector plate is exerted. This spring 40 causes the sector plate 18 to be eccentric relative to the hub 38 of the holding plate 22. In this position the mat 12 is spaced from the wheel 44. When the locking rod 28 is released from the sector plate 18, the latter being in an unstable equilibrium, will fall forwardly or backwardly. If it falls forwardly such as in the direction of the arrow B, the mat 12 rotating in an eccentric manner relative to the surface of the tire 44 will contact the latter in a position substantially as illustrated in FIG. 6. The tire 44 will then grip the mat and lead it in the lower direction as illustrated in FIG. 7. In this position (FIG. 7), the mat 12 is firmly in contact with the wheel 44 by the weight of the vehicle on the mat surface and by the upward pressure caused by the spring 40 upon the sector plate 18. Under a downward vertical traction, the leaf spring 40 will be compressed towards the hub 38 and both ends of the spring slide in the lower part of the recesses 42.

The traction wheel 44, being actuated in rotation, raises the mat 12 and the sector plate 18 partly by the friction between the mat and the outer surface of the wheel 44 followed by the centrifugal action received by the sector plate so that it will easily reach the top position and move into a second rotation around the wheel if additional friction is needed to release the car from the slippery ground surface. However, when the vehicle has been released from its stuck position, the sector plate may be locked into its upper position by releasing the rod 28 which is then biased into the direction of the sector plate.

The sector plate 18 is preferably provided with apertures 46 to reduce the weight while maintaining sufficient rigidity with ribs 48 to support the mat 12 over the flexible surface of the tire 44.

The surface of the mat may have a great variety of patterns similar to the gripping treads of snow or mud tires. However, the applicant, in order to reduce the weight of the mat 44, has conceived a zigzag rib 14 which is held on the inner edge of the tire 44 by the sector plate 18 and on the outer edge of the tire by a portion of a ring 16. A cross section of the rib is illustrated in FIG. 4 and comprises two opposed L-shaped members 48 which are held to the sector plate 18 and a portion 16 of a ring by supporting strips 50.

When the tire 44 which constitutes a traction wheel spins over a slippery surface such as snow or mud, without moving the car 10, a knob located inside the car such as on the front panel is pulled. The said knob which is connected to the cable 62 pulls the rod 28 and releases the sector plate 18. Any small movement of the car produces a rotation of the sector plate 18 which rotates in a downward direction to a position shown in FIGS. 1 and 6. The mat rotating in an eccentric path relative to the tread surface of the tire 44 comes in contact with the surface of the latter and by friction is engaged to rotate under the tire and to come in contact with the slippery material. The mat which has a highly tractional surface is tightened between the ground and the sole surface of the wheel and increases the frictional traction therebetween. As the wheel 44 spins, the mat continues its rotation into an upward direction and repeats the above-described operation as long as the locking rod 28 is released from the sector plate 18.

When the car has pulled itself out of the stranded situation, the cable 52 is released and the rod 28 will engage the hole 54 of the sector plate 18 and lock the latter in its upper position.

It is obvious that the eccentric rotation of the sector plate may be obtained by a different arrangement of spring means and in particular by coil springs or the like mounted so as to eccentrically bias the sector plate relative to the wheel 44.

I claim:

1. A device for temporarily providing additional traction on the ground to a spinning traction wheel of a vehicle comprising, a traction mat above a segment of the wheel and spaced therefrom, a sector plate for connecting the traction mat to a casing of the axle of the vehicle adjacent the wheel for eccentrically rotating the mat around the wheel, so as to come in contact with the wheel at the bottom thereof, the said sector plate being fixed to the mat and having an aperture for mounting the said plate about the said casing, spring means for eccentrically rotating the plate, the sector plate being biassed upwardly in its upper position so that the mat is spaced from the wheel at the top thereof and in contact therewith at the bottom, wherein the said spring means is a crescent-shaped leaf spring mounted in the aperture between the sector plate and said casing and connected at both ends to the casing.

2. A device as recited in claim 1 wherein both ends of the spring are slidingly engaged in peripheral recesses around the casing.

3. A device as recited in claim 1, wherein the mat comprises a gripping rib having a zigzag shape extending over the width of the tire and the parts of the zigzag rib on the outer side of the tire are interconnected by a portion of a ring.

4. A device as recited in claim 3, wherein the rib has an L-shaped configuration, one flange of the L is adapted to sit on the tread of the tire, the other flange of the L extending transversely away therefrom.